United States Patent [19]

Sakata

[11] Patent Number: 5,249,849
[45] Date of Patent: Oct. 5, 1993

[54] ANTI-SKID CONTROL SYSTEM FOR A PART TIME FOUR-WHEEL DRIVE VEHICLE

[75] Inventor: Yasunori Sakata, Toyota, Japan

[73] Assignee: Aisin Seiki Kabushiki Kaisha, Kariya, Japan

[21] Appl. No.: 925,634

[22] Filed: Aug. 7, 1992

[30] Foreign Application Priority Data

Aug. 10, 1991 [JP] Japan .................. 3-225167

[51] Int. Cl.$^5$ .............................................. B60T 8/58
[52] U.S. Cl. .................... 303/100; 303/97; 303/103; 303/106; 180/233; 180/244; 180/247; 180/197; 364/426.02
[58] Field of Search .......... 303/95, 96, 97, 100, 303/103, 104, 105, 106, 24.1; 180/233, 247, 244, 140, 197; 364/426.01, 426.02

[56] References Cited

U.S. PATENT DOCUMENTS

| | | | |
|---|---|---|---|
| 3,993,363 | 11/1976 | Skoyles et al. | 303/106 X |
| 4,762,376 | 8/1988 | Matsubara | 180/233 X |
| 4,859,002 | 8/1989 | Yoshino | 303/100 X |
| 4,932,726 | 6/1990 | Iwata et al. | 303/106 X |
| 4,962,970 | 10/1990 | Jonner et al. | 303/100 |
| 5,019,985 | 5/1991 | Yasuno et al. | 180/244 X |
| 5,028,095 | 7/1991 | Okubo | 303/100 |
| 5,056,354 | 10/1991 | Kuwana et al. | 73/9 |

FOREIGN PATENT DOCUMENTS 62-251264 11/1987 Japan .

Primary Examiner—Robert J. Oberleitner
Assistant Examiner—Peter M. Poon
Attorney, Agent, or Firm—Sughrue, Mion, Zinn, Macpeak & Seas

[57] ABSTRACT

The invention is directed to an arrangement for controlling a braking force applied to each of the road wheels of a part time four-wheel drive vehicle depending upon a braking condition, with a hydraulic braking pressure supplied to each of wheel brake cylinders through pressure control valves respectively. The pressure control valves are controlled by the braking force controller into which output signals of wheel speed sensors are fed. A deceleration of the vehicle is detected by a deceleration sensor. In a counter, counted is the number of repetitions of decrease of the wheel speed of each road wheel down to below a predetermined standard speed and recovery of the wheel speed up to and over the standard speed. The value counted in each road wheel during a predetermined period of time in the counter is compared with a predetermined value in a comparator. When it is determined that the value counted for each road wheel is equal to or greater than the predetermined value respectively and the deceleration detected by the deceleration sensor does not reach to a predetermined deceleration, a drive mode determination unit determines that the vehicle is in the four-wheel drive mode. In accordance with the result of the drive mode determination unit, the braking force control to be executed is selected in the controller.

7 Claims, 6 Drawing Sheets

ANTI-SKID CONTROL SYSTEM FOR A PART TIME FOUR-WHEEL DRIVE VEHICLE

BACKGROUND OF THE INVENTION

1. Field of the Invention

The present invention relates to an anti-skid control system for controlling a braking force applied to road wheels in braking operation of a vehicle to prevent the road wheels from being locked, and more particularly to an anti-skid control system adapted for a part time four-wheel drive vehicle for selectively providing a four-wheel drive mode and a two-wheel drive mode.

2. Description of the Prior Art

In order to prevent road wheels from being locked, there has been employed an anti-skid control system which controls the braking force by decreasing, increasing, or holding a hydraulic braking pressure supplied to each wheel brake cylinder operatively connected to each road wheel. According to the anti-skid control system, in general, detected is a rotational speed of each road wheel or wheel speed, and the hydraulic braking pressure in each wheel brake cylinder is controlled in response to each wheel speed, so as to obtain the maximum coefficient of friction.

As for a driving system of the vehicle, there is known a so called part time four-wheel drive system, or selective four-wheel drive system, wherein a two-wheel drive (2WD) mode for driving either axle of front road wheels or that of rear road wheels, and a four-wheel drive (4WD) mode for driving the axles of both front and rear road wheels are selectively provided. In this driving system, the axles of front and rear road wheels are directly connected with each other or a differential operation is limited in the four-wheel drive mode, so that the wheel speed of each road wheel tends to be synchronous with the wheel speeds of other road wheels, especially on a road of a low coefficient of friction. Therefore, it is difficult for such part time 4WD vehicle to employ the anti-skid control system generally employed in the two-wheel drive vehicle, such as a three channel control system which provides an independent control for the front road wheels and a low-select control for the rear road wheels.

In order to provide an appropriate anti-skid control in the four-wheel drive mode for the part time 4WD vehicle, in Japanese Patent Laid-open Publication No. 62-251264, for example, it has been proposed to change the braking force control into that of whole wheels simultaneous control in the four-wheel drive mode by means of a changeover switch. However, the changeover switch is expensive and likely to be damaged. Further, in the case where the braking force control is to be changed by means of the changeover switch, the braking force control is not necessarily appropriate in braking operation on a road of a high coefficient of friction. On the road of a high coefficient of friction, stopping distance may be shortened through the braking force control for the two-wheel drive mode even in the four-wheel drive mode.

SUMMARY OF THE INVENTION

Accordingly, it is an object of the present invention to provide an anti-skid control system for use in a part time four-wheel drive vehicle, which determines a four-wheel drive mode changed from a two-wheel drive mode, and selects a braking pressure control in accordance with each drive mode of the vehicle.

It is another object of the present invention to provide a system for determining a drive mode of a part time four-wheel drive vehicle, which can detect a changeover from a two-wheel drive mode to a four-wheel drive mode without employing the changeover switch.

In accomplishing the above and other objects, an anti-skid control system, which controls a braking force applied to road wheels of an automotive vehicle for selectively providing a four-wheel drive mode and a two-wheel drive mode, comprises wheel brake cylinders which are operatively connected to right and left road wheels, respectively, at front and rear sides of the vehicle for applying braking force thereto, a hydraulic pressure generator for supplying a hydraulic braking pressure to each of the wheel brake cylinders, actuating means disposed in each hydraulic circuit communicating the hydraulic pressure generator with each of the wheel brake cylinders for individually controlling the hydraulic braking pressure supplied to each of the wheel brake cylinders, wheel speed detecting means for detecting each of the road wheels, and braking force control means for controlling the actuating means in response to the output signal of the wheel speed detecting means to control the braking force applied to the road wheels. The anti-skid control system is provided with deceleration detecting means for detecting a deceleration of the vehicle, count means for counting the number of repetitions of decrease of the wheel speed of each road wheel down to below a predetermined standard speed and recovery of the wheel speed up to and over the predetermined speed, comparing means for comparing the value counted for each road wheel during a predetermined period of time in the count means with a predetermined value, and drive mode determination means for determining that the vehicle is in the four-wheel drive mode when it is determined that the value counted for each road wheel is equal to or greater than the predetermined value respectively and the deceleration detected by the deceleration detecting means does not reach a predetermined deceleration. The braking force control means is so arranged that the braking force control executed thereby is selected in accordance with the result of the drive mode determination means.

Preferably, a system for determining a drive mode of the vehicle comprises means for detecting a rotational speed of each road wheel of the four road wheels, means for detecting a deceleration of the vehicle, means for counting the number of repetitions of decrease of the wheel speed of each road wheel down to below a predetermined speed and recovery of the wheel speed up to and over the predetermined speed, means for comparing the value, which is counted for each road wheel in the counting means for a predetermined period of time, with a predetermined value, and means for determining that the vehicle is in the four wheel drive mode when the value counted for each road wheel is equal to or greater than the predetermined value and the deceleration detected by the deceleration detecting means does not reach a predetermined deceleration.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
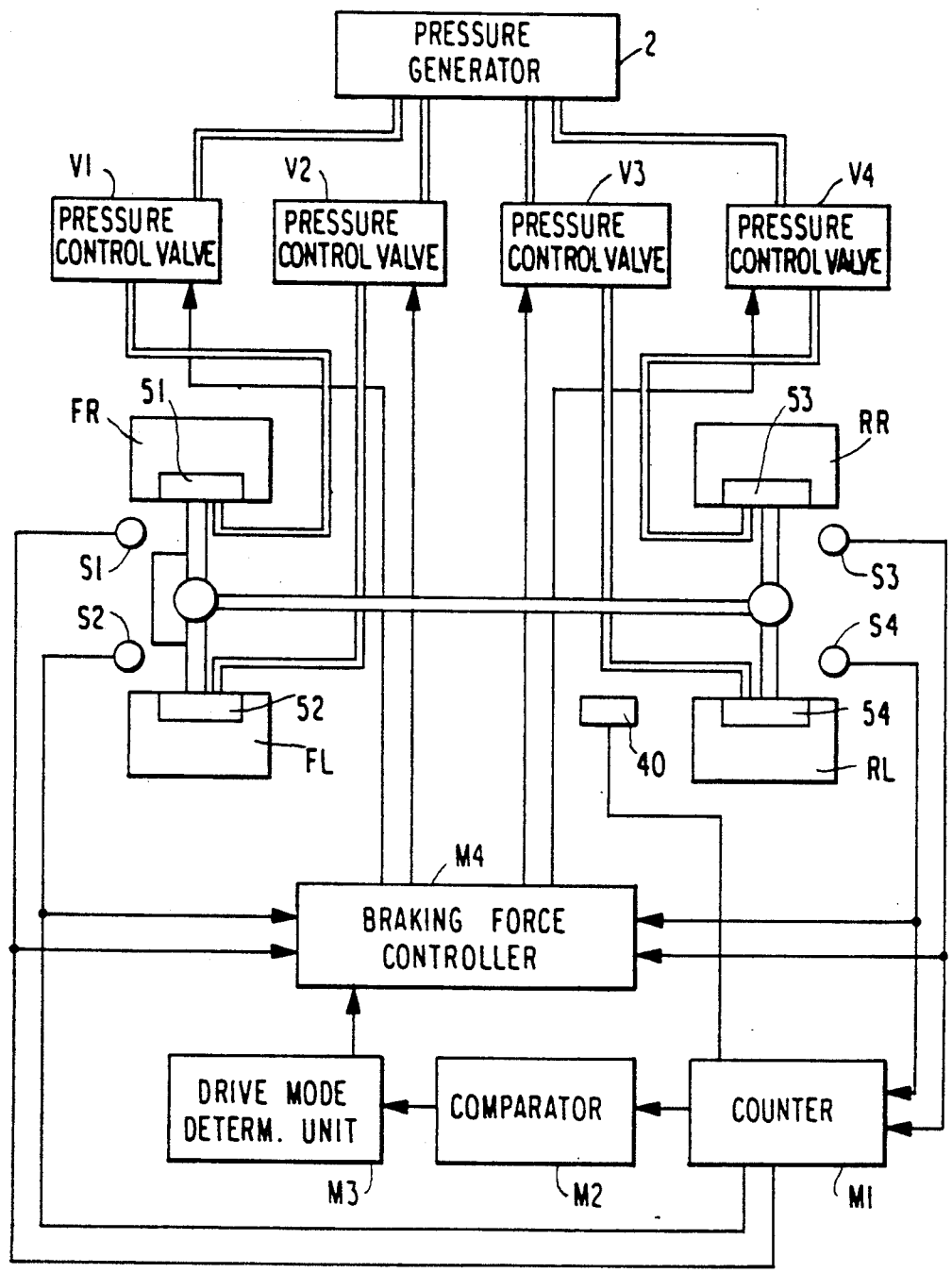
FIG. 1 is a general block diagram illustrating an anti-skid control system according to the present invention.

Referring to FIG. 1, there is schematically illustrated an anti-skid control system according to the present invention, which controls a braking force applied to each of right and left front road wheels FR, FL and right and left rear road wheels RR, RL of a vehicle individually depending upon a braking condition. In this anti-skid control system, it is so arranged that when the hydraulic pressure generator 2 is operated, a hydraulic braking pressure is supplied to each of wheel brake cylinders 51-54 through pressure control valves V1-V4, so that a braking force is applied to each of the road wheels FR, FL and RR, RL. And, wheel speeds of the road wheels FR, FL, RR, RL are detected by wheel speed sensors S1-S4 respectively. The pressure control valves V1-V4 are controlled by the braking force controller M4, into which output signals of the wheel speed sensors S1-S4 are fed. Further, a deceleration of the vehicle is detected by a deceleration sensor 40. In a counter M1, counted is the number of repetitions of decrease of the wheel speed of each road wheel down to below a predetermined standard speed and recovery of the wheel speed up to and over the standard speed. The value counted for each road wheel during a predetermined period of time in the counter M1 is compared with a predetermined value in a comparator M2. When it is determined that the value counted for each road wheel is equal to or greater than the predetermined value respectively and the deceleration detected by the deceleration sensor 40 does not reach a predetermined deceleration, a drive mode determination unit M3 determines that the vehicle is in the four-wheel drive mode. In accordance with the result of the drive mode determination unit M3, the braking force control to be executed in the controller M4 is selected.

Figure 2:
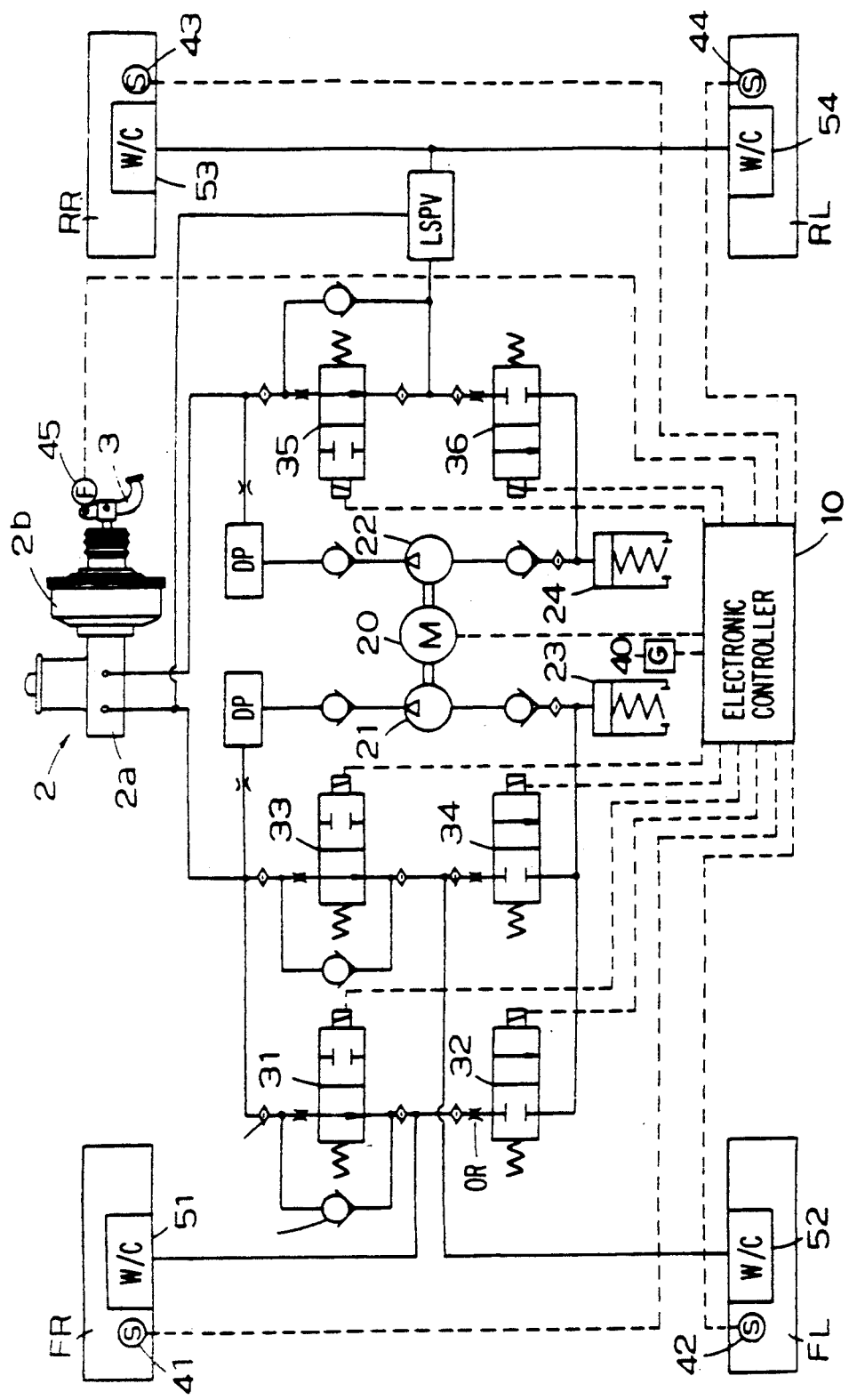
FIG. 2 is a schematic block diagram of an anti-skid control system of an embodiment of the present invention.

More specifically, an embodiment of the present invention is illustrated in FIGS. 2 to 5. Referring to FIG. 2, pumps 21, 22, reservoir 23, 24 and solenoid valves 31 to 36 are disposed in hydraulic circuits for connecting a hydraulic pressure generator 2, which comprises a master cylinder 2a and a booster 2b operated in response to depression of a brake pedal 3, to wheel brake cylinders 51 to 54 operatively connected to road wheels FR, FL, RR, and RL, respectively. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side. There are selectively provided a four-wheel drive (i.e. 4WD) mode in which the front road wheels FR, FL and rear road wheels RR, RL are driven, and a two-wheel drive (i.e. 2WD) mode in which only rear road wheels RR, RL are driven, to constitute so called part time 4WD.

The solenoid valves 31, 32 and solenoid valves 33, 34 are disposed respectively in hydraulic circuits for connecting one output port of the master cylinder 2a to the wheel brake cylinders 51, 52, and the pump 21 is disposed between the master cylinder 2a and the solenoid valves 31 to 34. Similarly, the solenoid valves 35, 36 are disposed respectively in hydraulic circuits for connecting the other output port of the master cylinder 2a to the wheel brake cylinders 53, 54, and the pump 22 is disposed between the master cylinder 2a and the solenoid valves 35, 36. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the normally open solenoid valves 31, 33, 35. The hydraulic circuits at the drain side of the normally closed solenoid valves 32, 34 are connected to the pump 21 through the reservoir 23, and the hydraulic circuit at the drain side of the solenoid valve 36 is connected to the pump 22 through the reservoir 24. Each of the reservoirs 23, 24 is provided with a piston and a spring, and functions so as to store the brake fluid returned from each of the solenoid valves 32, 34, 36 through the hydraulic circuits at the drain side thereof, and to supply the brake fluid to each of those solenoid valves when the pumps 21, 22 operate.

Each of the solenoid valves 31 to 36 is a two ports-two positions solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves CH shown in FIG. 2 permit the brake fluid to return from each of the wheel brake cylinders 51 to 54 and the reservoirs 23, 24 to the hydraulic pressure generator 2, and blocks the counterflow of the brake fluid. In FIG. 2, FL denotes a filter, OR denotes an orifice, and DP denotes a damper. These have been known, so that the explanation thereof is omitted. The damper DP for preventing a pulsation of hydraulic pressure caused in the hydraulic circuits is not necessarily required to be disposed in the hydraulic circuits in a certain design. LSPV denotes a load sensing proportioning valve which is provided for obtaining an ideal braking force distribution between front and rear road wheels and especially for varying a hydraulic pressure at a break point in response to a rear axle load. Its structure has been known, so that the explanation thereof is omitted.

Accordingly, with each of the solenoid valves 31 to 36 energized or de-energized, the hydraulic braking pressure in each of the wheel brake cylinders 51 to 54 is decreased, held or increased. Namely, when the current is not fed to the solenoid coil of each of the solenoid valves 31 to 36, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. Further, when the current is fed only to the solenoid coils of the solenoid valves 31, 33, 35, the hydraulic braking pressure in each wheel brake cylinder is held. As the solenoid valves 31 to 36, there may be employed three ports-two positions solenoid operated valves of a half number of the valves 31 to 36.

The above-described solenoid valves 31 to 36 are connected to the electronic controller 10 which controls the operation of the solenoid valves 31 to 36. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor. A deceleration sensor 40 is electrically connected to the electronic controller 10 to detect a deceleration of the vehicle, i.e., negative value of acceleration, and feed an output signal to the controller 10. The deceleration sensor 40 is also called as G sensor, and various types thereof using a mercury switch, photosensor, Hall sensor or the like have been known. There is also provided a brake switch 45 which is turned on when the brake pedal 3 is depreased, and turned off when the brake pedal 3 is released, and which is electrically connected to the electronic controller 10.

Figure 3:
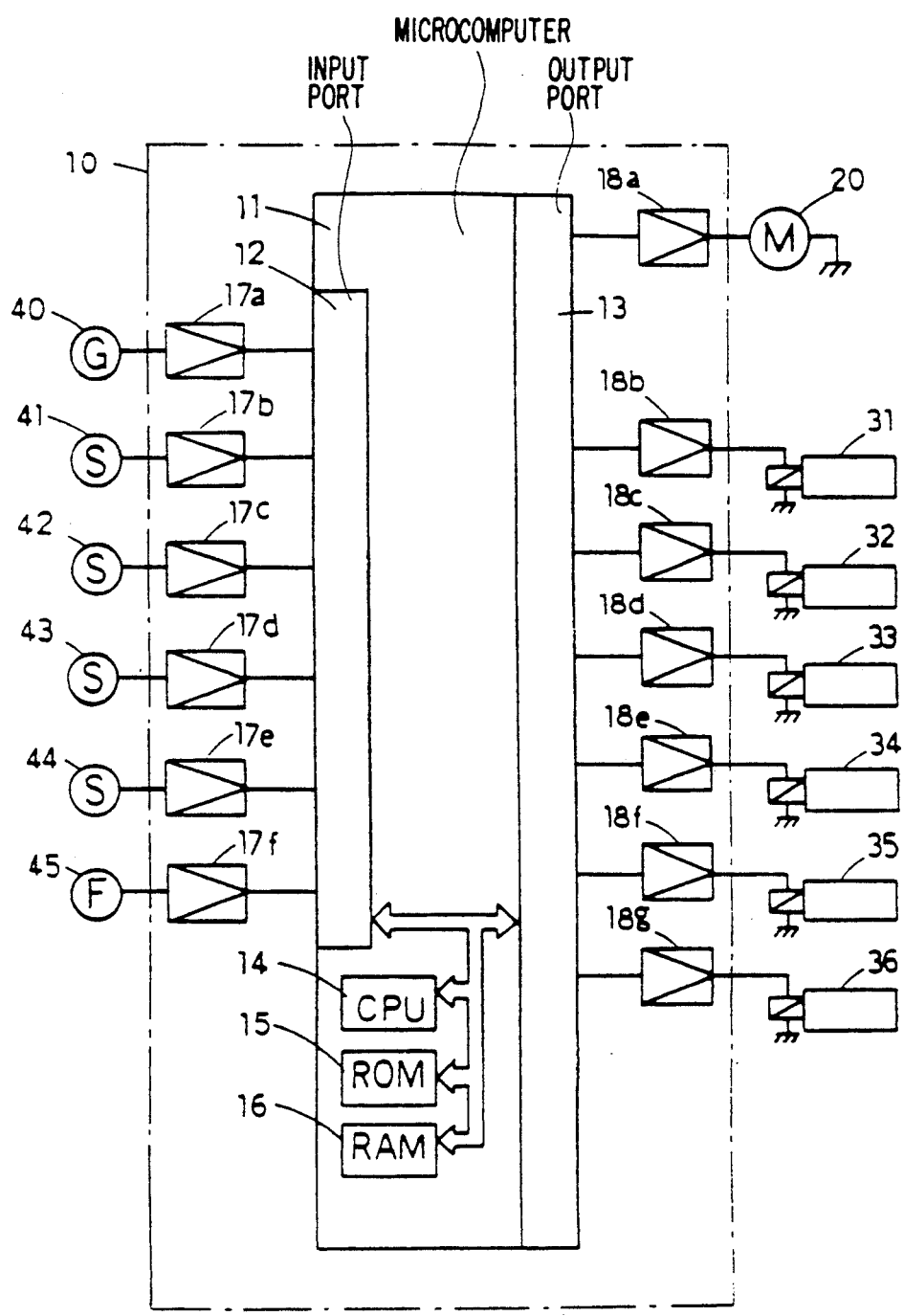
FIG. 3 is a block diagram illustrating the arrangement of the electronic controller shown in FIG. 2.

As shown in FIG. 3, the electronic controller 10 is provided with a one-chip microcomputer 11, which includes a central processing unit or CPU 14, a read-only memory or ROM 15 and a random access memory or RAM 16, which are connected with an input port 12 and an output port 13 via a common bus to execute the input/output operations relative to external circuits. The signals detected by the deceleration sensor 40, each of the wheel speed sensors 41 to 44 and the brake switch 45 are fed to the input port 12 via respective amplification circuits 17a to 17e and then to the CPU 14. Then, a control signal is output from the output port 13 to the electric motor 20 via a drive circuit 18a, and control signals are output to the solenoid valves 31 to 36 via the respective drive circuits 18b to 18g.

Figure 4:
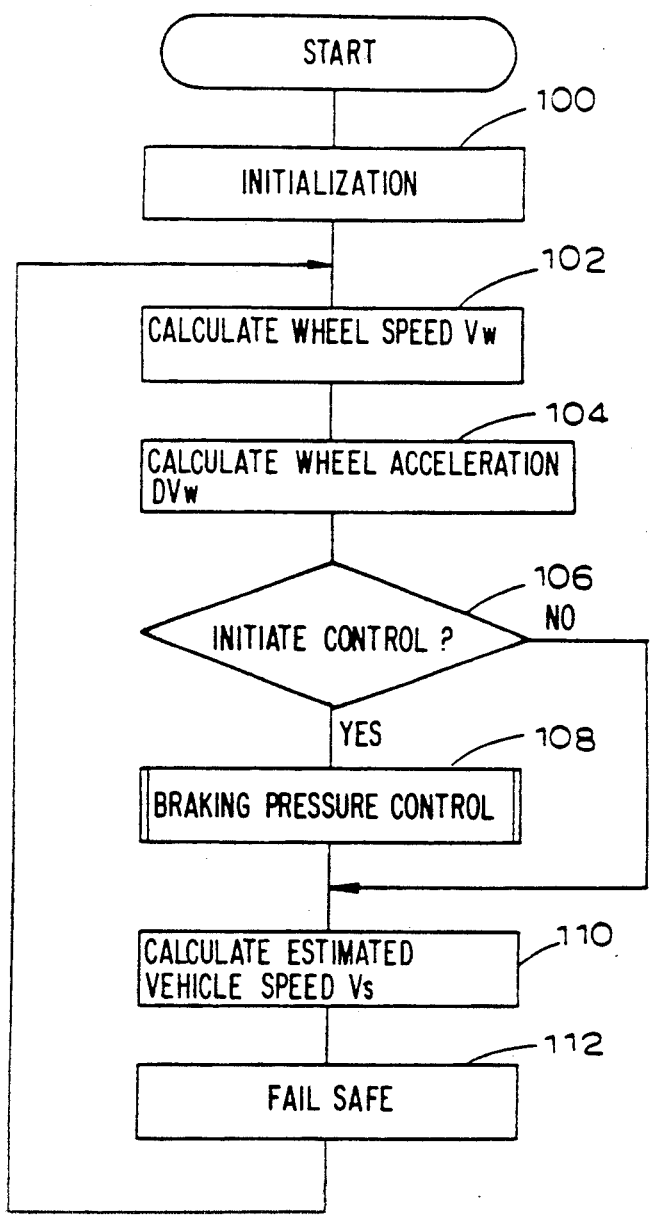
FIG. 4 is a flowchart showing the operation of the braking force control of the electronic controller according to an embodiment of the present invention.

A program routine executed by the electronic controller 10 for the anti-skid control will now be described with reference to FIGS. 4 and 5. FIG. 4 is a flowchart showing a main routine executed in accordance with a program of one embodiment of the present invention, which is executed repeatedly at intervals of a predetermined period of time.

The program routine in FIG. 4 starts when a power source is turned on, and provides for initialization of the system at Step 100, wherein an estimated vehicle speed Vs which corresponds to the value representing a vehicle speed, a wheel speed Vw and a wheel acceleration DVw of each road wheel are set to zero. Then, the program proceeds to Step 102 where the wheel speed Vw detected by each of the wheel speed sensors 41 to 44 is read in the microcomputer 11. The estimated vehicle speed Vs is calculated as follows. A vehicle speed in braking operation is set to a value calculated on the assumption that the vehicle speed is reduced with a predetermined deceleration from the vehicle speed corresponding to the wheel speed in braking operation, and then, if the wheel speed of any one of four road wheels exceeds the wheel speed corresponding to the vehicle speed as set above, the vehicle speed is reset to a value calculated on the assumption that the vehicle speed of the value previously set is reduced with the predetermined deceleration again from the vehicle speed corresponding to the exceeded wheel speed. That is, the estimated vehicle speed Vs is set in accordance with the maximum value of the wheel speeds. Next, at Step 106, locking condition of each road wheel is determined in accordance with the output of the brake switch 45, the wheel speed Vw and wheel acceleration DVw, and the condition for initiating the anti-skid control is determined. If it is determined that the initiating condition is satisfied, the program proceeds to Step 108, otherwise it proceeds to Step 110. At Step 108, the solenoid valves 31-36 are energized or de-energized depending upon the locking condition of each road wheel, so that the hydraulic braking pressure in the wheel braking cylinders 51-54 is increased or decreased. The aforementioned routine will be repeated, until those for all the road wheels are completed. Then, the program proceeds to Step 110 where the estimated vehicle speed Vs is calculated. After a fail-safe procedure is executed at Step 112, the program returns to Step 102.

Figure 5:
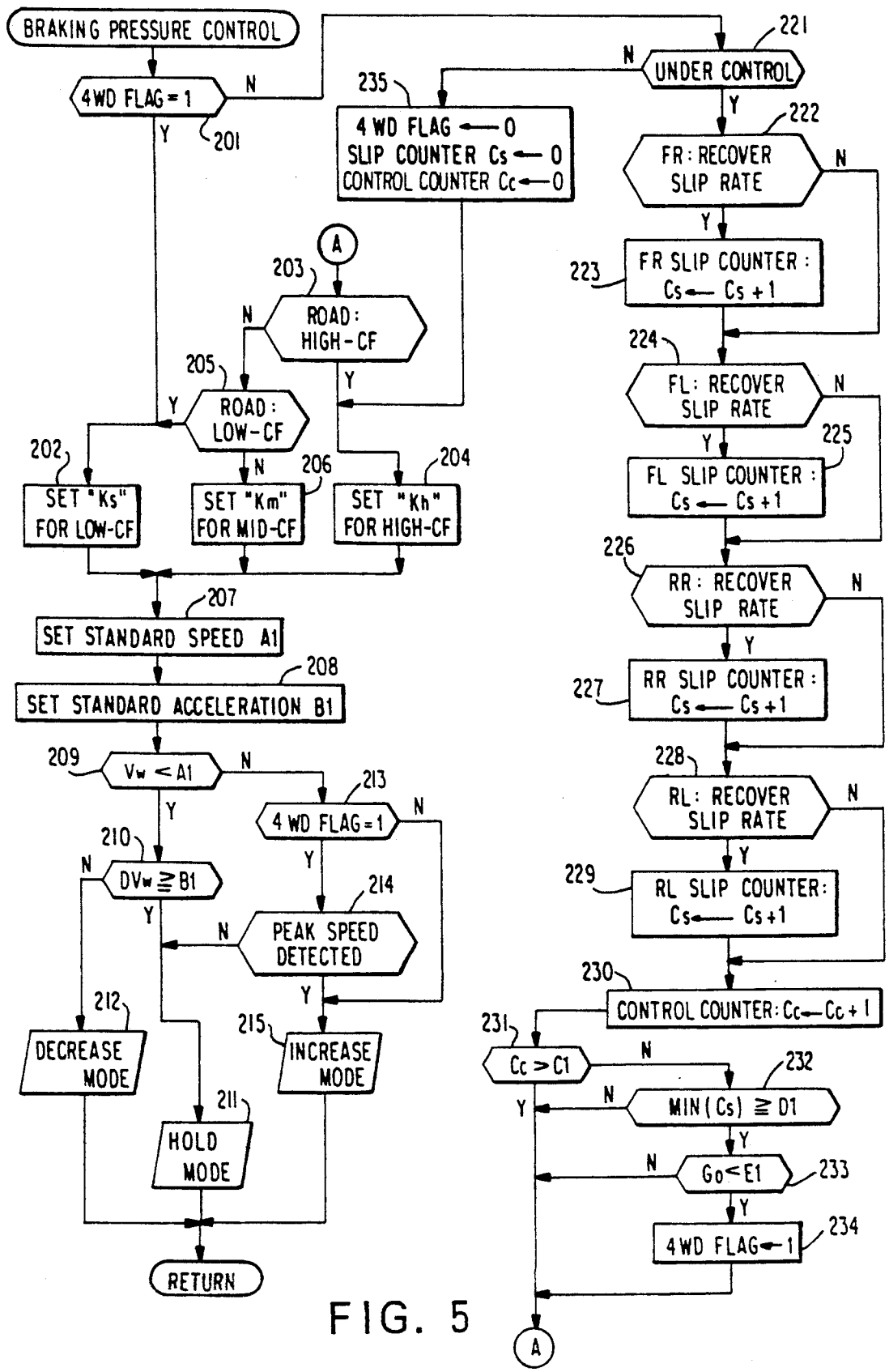
FIG. 5 is a flow chart of the braking pressure control in the braking force control according to the above embodiment.

FIG. 5 shows a subroutine of Step 108 in FIG. 4 for the control of the hydraulic braking pressure, which will be described hereinafter. In FIG. 5, "Y" represents "Yes" and "N" represents "No". At the outset, it is determined at Step 201 whether a 4WD flag, which indicates that the four-wheel drive mode has been selected, is set or not. If it is determined that the 4WD flag is set (to "1"), the program proceeds to Step 202 where a constant "Ks" for a low coefficient of friction, as described later, is set. If it is determined at Step 201 that the 4WD flag is not set, the program proceeds to Steps 221-235 and then proceeds to Steps 203 and 205 where the coefficient of friction of a road (hereinafter referred to as road CF) is determined. That is, by comparing the wheel acceleration DVw with a predetermined value, for example, it is determined at Step 203 whether the road CF corresponds to a certain high value of coefficient of friction (hereinafter referred to as high-CF) higher than a predetermined value, or not. If the road CF is determined to correspond to the high-CF, the program proceeds to Step 204 where a constant "Kh" for the high-CF is set. If it is not, the program proceeds to Step 205 where it is determined whether the road CF corresponds to a certain low value of coefficient of friction (hereinafter referred to as low-CF) lower than another predetermined value, or not. If it is determined to correspond to the low-CF, a constant "Ks" for the low-CF is set at Step 202, otherwise a constant "Km" for a certain value between the high value and low value of coefficient of friction (hereinafter referred to as mid-CF) is set at Step 206.

Then, at Steps 207 and 208, a standard speed A1 and standard acceleration B1 are set in accordance with those constants Kh, Km, Ks. And, the program proceeds to Step 209 where the wheel speed Vw is compared with the standard speed A1. If the wheel speed Vw is less than the standard speed A1, the program proceeds to Step 210 where the wheel acceleration DVw is compared with the standard acceleration B1. When it is determined at Step 210 that the wheel acceleration DVw is equal to or greater than the standard acceleration B1, a hold mode signal is output at Step 211. On the contrary, when it is determined that the wheel acceleration DVw is less than the standard acceleration B1, a decrease mode signal is output at Step 212 and the program returns to the main routine. If it is determined that the wheel speed Vw is equal to or greater than the standard speed A1 at Step 209, the program proceeds to Step 213 where it is determined whether the 4WD flag is set or not. If the result is affirmative, the program proceeds to Step 214 where it is determined whether the wheel speed Vw has reached to its peak wheel speed or not. If it has reached the peak wheel speed, the program proceeds to Step 215 where an increase mode signal is output, otherwise a hold mode signal is output at Step 211. In the case where it is determined at Step 213 that the 4WD flag is not set, the increase mode signal is output at Step 215.

Next will be explained Steps 221-235. In the case where it is determined at Step 201 that the 4WD flag is not set, the program proceeds to Step 221 where it is determined whether the anti-skid control is being performed or not, in accordance with data of a control counter Cc provided in the microcomputer 11. If it is determined that the anti-skid control is presently being performed, a slip state of each of four road wheels is determined at Steps 222-229. Then, a slip counter provided in the microcomputer 11 is activated in accordance the result of determination of the slip state. That is, it is determined whether the wheel speed Vw of the right front road wheel FR has been recovered from a slip state, where the wheel speed Vw is less than the standard speed A1, to reach a speed equal to or greater than the standard speed A1. If it is determined that the wheel speed Vw of the road wheel FR has been recovered, the slip counter for the road wheel FR is incremented by "1", i.e., a counted value Cs is added by one. Then, slip counters for other road wheels FL, RR, RL are operated in the same manner as described above at Steps 224-229. Thus, in the four-wheel drive mode, the decrease and recovery of the wheel speed of each road wheel are caused synchronously, or with a half period delayed, with respect to all the road wheels, so that it can be determined whether the four-wheel drive mode is being performed or not, in accordance with the number of repetitions of the decrease and recovery of the wheel speed. Then, the program proceeds to Step 230 where a control counter, which starts counting at the time of initiation of the anti-skid control, is incremented by "1", i.e., a counted value Cc is added by one, and the counted value Cc is compared with a predetermined standard value C1 at Step 231.

If it is determined at Step 231 that the counted value Cc is less than the standard value C1, i.e., during a certain period of time after the initiation of the anti-skid control, the program proceeds to Step 232 where the minimum value MIN(Cs) of the counted value Cs in the slip counter for each road wheel is compared with a predetermined standard value D1. If it is determined that the minimum value MIN(Cs) is equal to or greater than the standard value D1, i.e., if all the counted values of slip counters for all the road wheels are determined to be equal to or greater than the standard value D1, then the program proceeds to Step 233 where the output value Go of the deceleration sensor 40 is compared with a predetermined standard value E1. If it is determined that the value Go is less than the standard value E1, the program proceeds to Step 234 where the 4WD flag is set (to "1"), and then to Step 203 where the road CF is determined as described above. If the value Cc of the control counter is greater than the standard value C1, the program proceeds to Step 203 without executing Steps 232-234. If it is determined at Step 232 that the minimum value MIN(Cs) is less than the standard value D1, or if it is determined at Step 233 that the output Go of the deceleration sensor 40 is equal to or greater than the standard value E1, the program proceeds to Step 203 where the road CF is determined. On the contrary, if it is determined at Step 221 that the anti-skid control is not being performed, the 4WD flag is reset (to "0") at Step 235, then the slip counters and control counters for all the road wheels are cleared, and then the program proceeds to Step 204 where the constant "Kh" for the high-CF is set.

Figure 6:
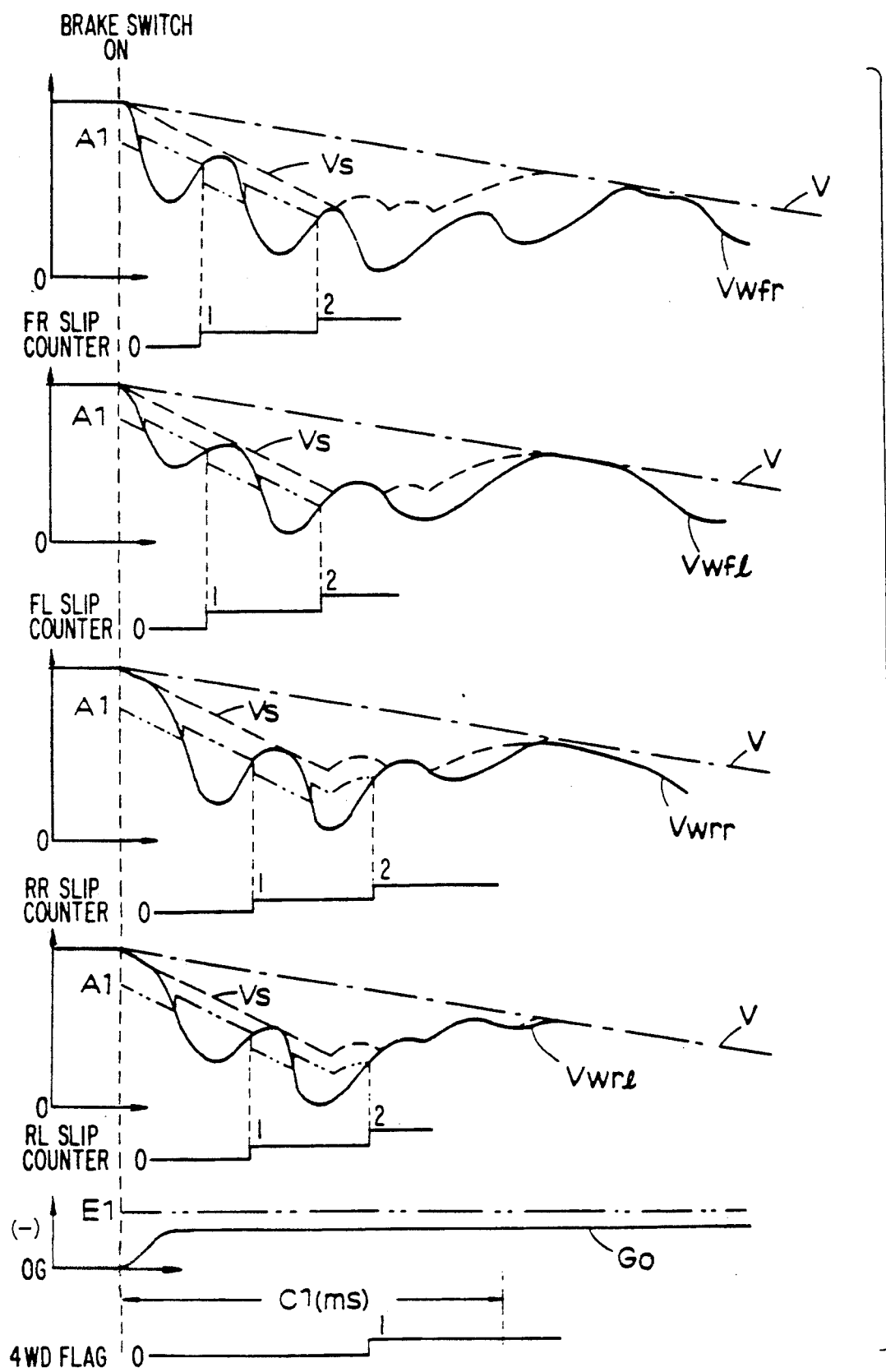
FIG. 6 is a diagram showing the variation of wheel speeds of four road wheels during the anti-skid operation and values counted for determining a drive mode of a vehicle in the above embodiment.

FIG. 6 illustrates an example of variations of the wheel speeds Vwfr, Vwfl, Vwrr, Vwrl of road wheels FR, FL, RR, RL, the output Go of deceleration sensor 40, and the states of the slip counters and the 4WD flag during the braking pressure control, where each solid line indicates each wheel speed, two dotted-chain line indicates the standard speed A1, one dotted-chain line indicates the actual vehicle speed V, and broken line indicates the estimated vehicle speed Vs. In FIG. 6, after the brake switch 45 is turned on and the braking pressure control is initiated, and until the control counter counts more than the standard value C1, provided that the output Go of deceleration sensor 40 is less than the standard value E1, when the slip counter for the rear road wheels counts "2", the 4WD flag is set (to "1").

As described above, when it is determined at Step 201 that the 4WD flag is set, the constant Ks for the low-CF is set initially. Unless the 4WD flag is set, one of the constants Kh, Km, Ks is set in accordance with the road surface condition, i.e., road CF, as in the braking pressure control for a rear two-wheel drive mode (at Step 203-206). On the contrary, in the case where the vehicle is in the four-wheel drive mode, if the vehicle is braked on a road of low-CF, the 4WD flag is set (at Step 234). That is, it is easily determined whether the vehicle is in the four-wheel drive mode or not, in accordance with the output from the deceleration sensor 40 and the minimum value of the slip counters provided in the electronic controller 10 for the four road wheels. In this case, therefore, even if the system is in the condition that the increase mode signal is allowed to be output, it is changed over such that the hold mode signal is output until the peak wheel speed is detected at Step 214, and it is so controlled that the increase mode signal is output after the peak wheel speed is detected. In other words, on the high-Cf road surface, the stopping distance can be shortened through the braking pressure control for the two-wheel drive mode, since the road wheels interfere each other in the four-wheel drive mode. Whereas, on the low-CF road surface, when the four-wheel drive mode is selected, each wheel speed is decreased largely. Therefore, the increase mode is changed over to the hold mode, so that a stable braking operation can be maintained.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to road wheels of an automotive vehicle for selectively providing a four-wheel drive mode and two-wheel drive mode, comprising:

wheel brake cylinders operatively connected to right and left road wheels, respectively, at front and rear sides of said vehicle for applying a braking force thereto;

a hydraulic pressure generator for supplying a hydraulic braking pressure to each of said wheel brake cylinders;

actuating means disposed in each hydraulic circuit communicating said hydraulic pressure generator with each of said wheel brake cylinders for individually controlling the hydraulic braking pressure in each of said wheel brake cylinders;

wheel speed detecting means for detecting a wheel speed of each of said road wheels;

braking force control means for controlling said actuating means in response to an output signal of said wheel speed detecting means to control the braking force applied to said road wheels;

deceleration detecting means for detecting a deceleration of said vehicle;

count means for counting the number of repetitions of decrease of the wheel speed of each road wheel down to below a predetermined standard speed and recovery of the wheel speed up to and over the predetermined speed;

comparing means for comparing the value counted for each road wheel during a predetermined period of time in said count means with a predetermined value; and drive mode determination means for determining that said vehicle is in the four-wheel drive mode when it is determined that the value counted for each road wheel is equal to or greater than the predetermined value respectively and the deceleration detected by said deceleration detecting means does not reach a predetermined deceleration, the braking force control executed by said braking force control means being selected in accordance with the result of said drive mode determination means.

2. An anti-skid control system according to claim 1, wherein said braking force control means controls said actuating means to selectively provide an increase mode for increasing the hydraulic braking pressure in each of said wheel brake cylinders, a hold mode for holding said hydraulic braking pressure and a decrease mode for decreasing said hydraulic braking pressure.

3. An anti-skid control system according to claim 2, wherein said braking force control means includes peak detecting means for detecting a peak of the wheel speed of each road wheel, and controls said actuating means to provide the increase mode when said peak detecting means detects said peak, and provide the hold mode when said peak detecting means does not detect said peak.

4. An anti-skid control system according to claim 3, further comprising means for determining a coefficient of friction of a road under each road wheel and setting one of the constants for low coefficient of friction, medium coefficient of friction and high coefficient of friction corresponding to the coefficient of friction of said road, wherein said braking force control means controls said actuating means in accordance with the constant set by said coefficient of friction determining means.

5. An anti-skid control system according to claim 4, wherein said braking force control means controls said actuating means in accordance with the constant for the low coefficient of friction, when said drive mode determination means determines that said vehicle is in the four-wheel drive mode.

6. A system for determining a drive mode of an automotive vehicle for selectively providing a four-wheel drive mode and a two-wheel drive mode, comprising:

means for detecting a wheel speed of each road wheel of said vehicle;

means for detecting a deceleration of said vehicle;

means for counting the number of repetitions of decrease of the wheel speed of each road wheel down to below a predetermined speed and recovery of the wheel speed up to and over the predetermined speed;

means for comparing the value counted for each road wheel in said counting means during a predetermined period of time with a predetermined value; and for determining that said vehicle is in the four-wheel drive mode when the value counted for each road wheel is equal to or greater than the predetermined value and the deceleration detected by said deceleration detecting means does not reach a predetermined deceleration.

7. A system according to claim 6, wherein said comparing means compares the minimum value of the values counted for each road wheel in said counting means during the predetermined period of time with the predetermined value, and wherein said determining means determines that said vehicle is in the four-wheel drive mode when said minimum value is equal to or greater than the predetermined value and the deceleration detected by said deceleration detecting means does not reach a predetermined deceleration.

* * * * *